(12) United States Patent
Grebe et al.

(10) Patent No.: US 12,510,363 B2
(45) Date of Patent: Dec. 30, 2025

(54) SENSOR CONTROLLED SYSTEM, VEHICLE AND METHOD

(71) Applicant: KNORR-BREMSE Systeme fuer Nutzfahrzeuge GmbH, Munich (DE)

(72) Inventors: Jan Grebe, Munich (DE); Valer Merza, Szentendre (HU); Tamas Komlos, Csavoly (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 189 days.

(21) Appl. No.: 18/285,994

(22) PCT Filed: Mar. 4, 2022

(86) PCT No.: PCT/EP2022/055594
§ 371 (c)(1),
(2) Date: Oct. 6, 2023

(87) PCT Pub. No.: WO2022/214253
PCT Pub. Date: Oct. 13, 2022

(65) Prior Publication Data
US 2024/0118085 A1 Apr. 11, 2024

(30) Foreign Application Priority Data
Apr. 7, 2021 (EP) .................................... 21167224

(51) Int. Cl.
*G07C 5/00* (2006.01)
*B60G 17/017* (2006.01)
(Continued)

(52) U.S. Cl.
CPC ............ *G01C 21/20* (2013.01); *B60G 17/017* (2013.01); *B60Q 9/008* (2013.01); *B60T 7/22* (2013.01); *B60G 2500/324* (2013.01)

(58) Field of Classification Search
CPC ................. G01C 21/20; B60G 17/017; B60G 2500/324; B60Q 9/008; B60T 7/22
See application file for complete search history.

(56) References Cited

U.S. PATENT DOCUMENTS

| 5,864,285 A * | 1/1999 | Wieder .................. B60W 30/06 |
|---|---|---|
| | | 340/436 |
| 11,541,913 B2 * | 1/2023 | Dausoa ..................... B61F 5/02 |

(Continued)

FOREIGN PATENT DOCUMENTS

| CN | 109017819 A | 12/2018 |
|---|---|---|
| EP | 1 787 613 A2 | 5/2007 |

(Continued)

OTHER PUBLICATIONS

International Search Report (PCT/ISA/210) issued in PCT Application No. PCT/EP2022/055594 dated Jun. 10, 2022 (3 pages).

(Continued)

*Primary Examiner* — Kito R Robinson
*Assistant Examiner* — Anthony Gabriel Mora
(74) *Attorney, Agent, or Firm* — Crowell & Moring LLP

(57) ABSTRACT

A sensor controlled system includes a ramp docking sensor mountable to a vehicle's rear end and configured to fulfill the functions required for assisting docking of a vehicle to a loading ramp. The ramp docking sensor is further configured to determine a vertical distance of the ramp docking sensor relative to a ground level and to determine a vertical distance between the ground level and a loading ramp sill of the loading ramp. In this system, the ramp docking sensor can also be utilized for height-detection of a cargo hold floor with respect to a ground level without requiring specified sensors for height adjustments.

17 Claims, 3 Drawing Sheets

(51) Int. Cl.
  *B60Q 9/00*  (2006.01)
  *B60T 7/22*  (2006.01)
  *G01C 21/20*  (2006.01)
  *G07C 5/02*  (2006.01)
  *G07C 5/04*  (2006.01)
  *G07C 5/08*  (2006.01)

(56) References Cited

U.S. PATENT DOCUMENTS

| | | | | |
|---|---|---|---|---|
| 2005/0073433 | A1* | 4/2005 | Gunderson | G01S 13/931 340/903 |
| 2008/0272562 | A1* | 11/2008 | Sabelstrom | B60G 17/017 280/6.153 |
| 2012/0020764 | A1* | 1/2012 | Nespor | B60P 3/055 414/545 |
| 2015/0294166 | A1* | 10/2015 | Kuehnle | B60Q 9/007 382/104 |
| 2016/0339823 | A1* | 11/2016 | Smith | B60P 1/027 |
| 2019/0316403 | A1* | 10/2019 | Aiello | E05F 7/00 |
| 2020/0207166 | A1* | 7/2020 | Froehlich | B60R 11/04 |
| 2021/0048141 | A1* | 2/2021 | Kimener | B65G 69/003 |
| 2021/0403001 | A1* | 12/2021 | Del Pero | G01C 21/3841 |
| 2022/0176959 | A1* | 6/2022 | Katsuki | G01G 9/00 |
| 2023/0134660 | A1* | 5/2023 | Lewis | B60G 17/01941 267/64.16 |

FOREIGN PATENT DOCUMENTS

| | | |
|---|---|---|
| EP | 2 489 531 A1 | 8/2013 |
| ES | 2 535 305 T3 | 5/2015 |
| JP | 61-241210 A | 10/1986 |
| SE | 1851542 A1 | 6/2020 |

OTHER PUBLICATIONS

Written Opinion (PCT/ISA/237) issued in PCT Application No. PCT/EP2022/055594 dated Jun. 10, 2022 (5 pages).

Extended European Search Report issued in European Application No. 21167224.1 dated Oct. 4, 2021 (7 pages).

* cited by examiner

SENSOR CONTROLLED SYSTEM, VEHICLE AND METHOD

BACKGROUND AND SUMMARY

The invention relates to a sensor controlled system for a vehicle, a vehicle and a method, in particular to a sensor controlled system, vehicle and method for assisting ramp approach.

Nowadays, heavy goods vehicles (HGV) are often equipped with assisting systems facilitating reverse driven approaches towards loading ramps. Simpler versions comprise an ultrasonic sensor, determining the distance between the HGV's rear side and the ramp, indicating the distance by acoustic or optic indication to a vehicle operator such that the vehicle operator may correctly position the HGV relative to the loading ramps. More sophisticated systems comprise radar or LIDAR sensors, that do not only provide distance information to the vehicle operator, but can also provide guiding information in a lateral direction such that the vehicle operator is not only assisted in positioning the HGV in the correct distance relative to the loading ramp, but also in the correct lateral position and orientation. Some of these assisting systems do not only provide guiding information to the vehicle operator, but engage with brakes, thrust and steering and actively guide the HGV in the correct position relative to the loading ramp.

Loading ramps exhibit different heights of the loading sill. For adapting the HGV's loading area floor to the loading ramp sill, the vehicle operator usually has to exit the cabin and adapt the vertical travel of the rear axle(s) by up- and down push buttons usually arranged at the rear of the HGV. More sophisticated systems store the loading ramp sill heights for different loading ramps and automatically adapt the vertical travel of the rear axle(s) depending on the current loading ramp.

The state of the art systems exhibit the disadvantages that approaching a ramp for unloading the HGV is cumbersome and requires several independent steps.

It is the object of the invention to eliminate the disadvantages of the current load ramp approach systems and to provide a system, a vehicle and a method that facilitates loading ramp approaches and loading/unloading procedures.

The object of the invention is solved by a system, a vehicle, and a method, in accordance with the independent claims. Advantageous further developments are subject-matter of the dependent claims.

Disclosed is a sensor controlled system, comprising: a ramp docking sensor mountable to a vehicle's rear end and configured to fulfill the functions required for assisting docking of a vehicle to a loading ramp, wherein the ramp docking sensor is further configured to determine a vertical distance of the ramp docking sensor relative to a ground level and to determine a vertical distance between the ground level and a loading ramp sill of the loading ramp. In this system, the ramp docking sensor can also be utilized for height-detection of a cargo hold floor with respect to a ground level without requiring specified sensors for height adjustments.

Preferably, the sensor controlled system further comprises an electronic control unit connected to the ramp docking sensor that is configured to receive sensor signal information from the ramp docking sensor, process the sensor signal information received from the ramp docking sensor, determine a vertical distance of the loading ramp sill relative to the ground level, and determine a vertical distance of a cargo hold floor of the vehicle. This allows a height adjustment of a cargo hold floor to a loading ramp sill.

Preferably, in the sensor controlled system, the electronic control unit is further configured to output control commands to height adjustment means of the vehicle that effect a reduction in a difference of the vertical distance between the ground level relative to the cargo hold floor and the vertical distance between the ground level relative to the loading ramp sill. This allows for an automated height adjustment of a cargo hold floor to a loading ramp sill without requiring a vehicle operator to exit the cabin and perform such an adjustment manually.

Preferably, in the sensor controlled system, the electronic control unit is further configured to output indication signals, indicating to a vehicle operator information that allows the vehicle operator to manually reduce a difference of the vertical distance between the ground level relative to the cargo hold floor and the vertical distance between the ground level relative to the loading ramp sill. This enables the vehicle operator to either manually adjust a height difference between a cargo hold floor and a loading ramp sill without exiting the cabin or allows to surveille an automatic adjustment.

Preferably, in the sensor controlled system, the ramp docking sensor is further configured to determine a distance to obstacles obstructing a path of the vehicle towards the loading ramp. During docking with a loading ramp, it often occurs that the vehicle collides with craning roofs or the like and damage to the obstacle and the vehicle occur. With this configuration, such obstacle collisions can be prevented.

Preferably, in the sensor controlled system, the electronic control unit is configured to determine occurrence of an imminent collision with the obstacle, and to output control commands to a brake system of the vehicle activating the brakes and preventing the collision, or to output indication signals, indicating to a vehicle operator that a collision is imminent. This configuration allows for an automated obstacle collision prevention.

Disclosed is a vehicle comprising the sensor controlled system of the previous claims, and means for altering the vertical distance of a cargo hold floor relative to the ground level.

Preferably, the vehicle further comprises brake means that can be operated by the electronic control unit.

Preferably, in the vehicle, the ramp docking sensor is arranged in the vehicle at or adjacent to the rear end in the center line+/−1.5 m, in the center line+/−1 m or in the center line+/−0.3 m, and at a height of 0.2 to 4.5 m, 0.2 to 1.5 m or 3.5 to 4.5 m above ground level, and in an orientation backwards 0°+/−10° in all axles, 0°+/−20° in all axles or 0°+/−40° in all axles.

Disclosed is a cargo hold floor level adjustment method, comprising the steps: activation of a ramp docking sensor, determining, by the ramp docking sensor, a vertical distance of the ramp docking sensor relative to a ground level and determining, by the same ramp docking sensor, a vertical distance between the ground level and a loading ramp sill of the loading ramp. By this method, the ramp docking sensor can also be utilized for height-detection of a cargo hold floor with respect to a ground level without requiring specified sensors for height adjustments.

Preferably, the method further comprises the steps: receiving, by an electronic control unit, the sensor signal information from the ramp docking sensor, processing, by the electronic control unit, the sensor signal information received from the ramp docking sensor, determining, by the electronic control unit, a vertical distance of the loading ramp sill relative to the ground level, and determining, by the electronic control unit, a vertical distance of a cargo hold floor of the vehicle. This allows a height adjustment of a cargo hold floor to a loading ramp sill.

Preferably, the method further comprises the step outputting, by the electronic control unit, control commands to height adjustment means of the vehicle that effect a reduction in a difference of the vertical distance between the ground level relative to the cargo hold floor and the vertical distance between the ground level relative to the loading ramp sill. This allows for an automated height adjustment of a cargo hold floor to a loading ramp sill without requiring a vehicle operator to exit the cabin and perform such an adjustment manually.

Preferably, the method further comprises the step outputting, by the electronic control unit, indication signals, indicating to a vehicle operator information that allows the vehicle operator to manually reduce a difference of the vertical distance between the ground level relative to the cargo hold floor and the vertical distance between the ground level relative to the loading ramp sill. This enables the vehicle operator to either manually adjust a height difference between a cargo hold floor and a loading ramp sill without exiting the cabin or allows to surveille an automatic adjustment.

Preferably, the method further comprises the step determining, by the ramp docking sensor, a distance to obstacles obstructing a path of the vehicle towards the loading ramp. During docking with a loading ramp, it often occurs that the vehicle collides with craning roofs or the like and damage to the obstacle and the vehicle occur. With this configuration, such obstacle collisions can be prevented.

Preferably, the method further comprises the steps determining, by the electronic control unit occurrence of an imminent collision with the obstacle, and outputting, by the electronic control unit, control commands to a brake system of the vehicle activating the brakes and preventing the collision, or outputting, by the electronic control unit, indication signals, indicating to a vehicle operator that a collision is imminent. This configuration allows for an automated obstacle collision prevention.

Below, the invention is elucidated by means of embodiments referring to the attached drawings.

DETAILED DESCRIPTION OF THE DRAWINGS

Figure 1:
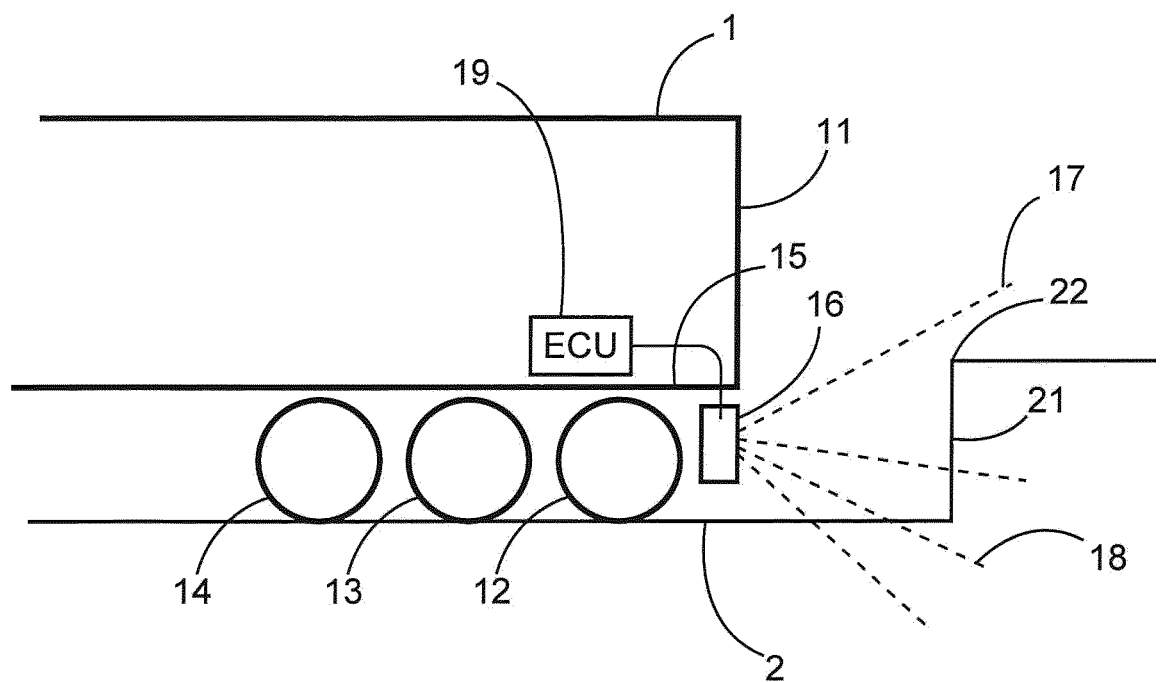
FIG. 1 illustrates a sensor controlled system according to a first embodiment.

FIG. 1 schematically shows a vehicle 1, in particular a heavy goods vehicle (HGV). Further in particular, vehicle 1 may also be the trailer car of a semitrailer. Vehicle 1 comprises a rear end 11 that represents the vehicle's 1 furthest rear extension in a longitudinal direction. The vehicle 1 further comprises at least one rear axle 12 and may comprise, like in the present embodiment, a second rear axle 13 and a third rear axle 14. Although the embodiment exhibits the first, the second and the third rear axle, the invention is also applicable to vehicles comprising only a first rear axle or a first and a second rear axle. All descriptions made in the embodiment to one of the rear axles is applicable to all other rear axles.

The at least one rear axle 12 is configured such that the vertical distance between the at least one rear axle 12 and the body of the vehicle 1 can be altered. In the embodiment, the vertical distance between the at least one axle 12 and the body of the vehicle 1 is increased by increasing the pressure in a pneumatic suspension of the at least one rear axle 12. This increases the distance of a cargo hold floor 15 relative to a ground level 2. The vertical distance between the at least one rear axle 12 and the body of the vehicle 1 is decreased by decreasing the pressure in the pneumatic suspension of the at least one rear axle 12. This also decreases the distance of the cargo hold floor 15 relative to the ground level 2. In this embodiment, the level of the cargo hold floor 15 is altered by increasing or decreasing the pressure in the pneumatic suspension or the at least one rear axle 12. However, any other alteration of the level of the cargo hold floor 15 is applicable within the scope of the invention, e.g. by means of altering the vertical distance of the vehicle's 1 cargo hold floor 15 with respect to the vehicle's 1 body.

The vehicle 1 further comprises a ramp docking sensor 16. In the embodiment, the ramp docking sensor 16 is a radar sensor. However other sensors, e.g. a LIDAR-sensor, are applicable. Particularly, any sensor is applicable that provides not only distance information but also direction information towards an obstacle. The ramp docking sensor 16 is configured such that it fulfils its function as a regular ramp docking sensor as known from the related art. It provides distance information and/or direction information with respect to a loading ramp 21. Further, the ramp docking sensor 16 is configured such that it detects—by means of a hypothetical scanning range 17—the height of a ramp sill 22 of the loading ramp 21. The ramp docking sensor 16 is further configured such that it detects—by means of a hypothetical scanning range 18—a vertical distance between the ground level 2 and the ramp docking sensor 16.

In addition to the ramp docking sensor, there may be an additional conventional height level sensor (not shown in the figures) that detects a vertical distance between the ground level 2 and the conventional height level sensor of the vehicle 1. By knowing the location of the mounting position of the conventional height level sensor, the height level of the vehicle can be determined. By additionally knowing the location of the mounting position of the ramp docking sensor 16, the vertical distance between the ground level 2 and the ramp docking sensor 16 may be determined by the conventional height level sensor.

Vice versa, the ramp docking sensor 16 may determine the height level of the vehicle and serve as backup sensor of the height level sensor. The ramp docking sensor 16 also may serve as the only height level sensor.

Besides serving as ramp docking sensor, ramp levelling sensor and/or height level sensor, the ramp docking sensor may also determine presence of obstacles. Thus, the ramp docking sensor 16 may additionally be configured as an obstacle avoidance sensor for all obstacles in its scanning range, in particular for high positioned obstacles like roofs.

In the embodiment, the ramp docking sensor 16 is arranged at the rear end 11 of the vehicle 1. It is further arranged in an area between 0.2 to 1.5 m above the ground level 2. It is further arranged in an area of 0.3 m left and right to the center line of the vehicle 1. The ramp docking sensor is oriented rearward at an angle of 10° downwards.

The sensor is connected to an electronic control unit 19 (ECU). ECU 19 performs evaluation of the sensor signals and determines position and distance of the loading ramp 21, height of the loading ramp sill 22 and height of the vehicle cargo hold floor 15. The latter is determined by the distance between the ground level and the ramp docking sensor 16 corrected by a height difference of the sensor relative to the cargo hold floor 15 that is known to the ECU. Based on that determination, the ECU automatically adapts the level of the cargo hold floor 15 with respect to the level of the loading ramp sill 22 by initiating an alteration of the pressure in the vehicle's 1 pneumatic suspension.

Figure 2:
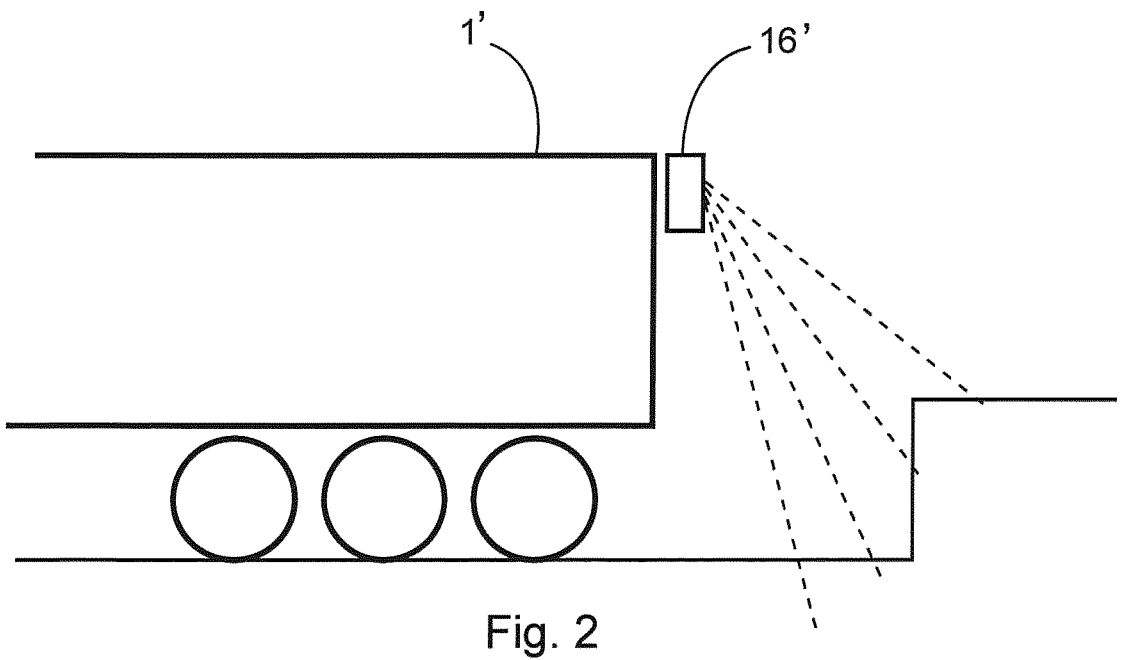
FIG. 2 illustrates a sensor controlled system according to a second embodiment.

FIG. 2 exhibits a vehicle 1' as an alternative embodiment of the invention. Vehicle 1' corresponds to vehicle 1 in all aspects except for the position of the ramp docking sensor 16'. In contrast to the ramp docking sensor 16, alternative ramp docking sensor 16' is not arranged near the cargo hold floor 15 but at or adjacent to the vehicle's 1' roof or upper end. In the amended embodiment, the alternative ramp docking sensor is arranged in an area 3.5 to 4 m above the ground level oriented backwards at an angle of 40° downwards.

With this configuration, the ramp docking sensor 16' may better monitor high objects like roofs or the like and additionally may better serve for collision avoidance with such objects. Further, the ramp docking sensor may be affected less by sensor shadows caused by low objects.

Figure 3:
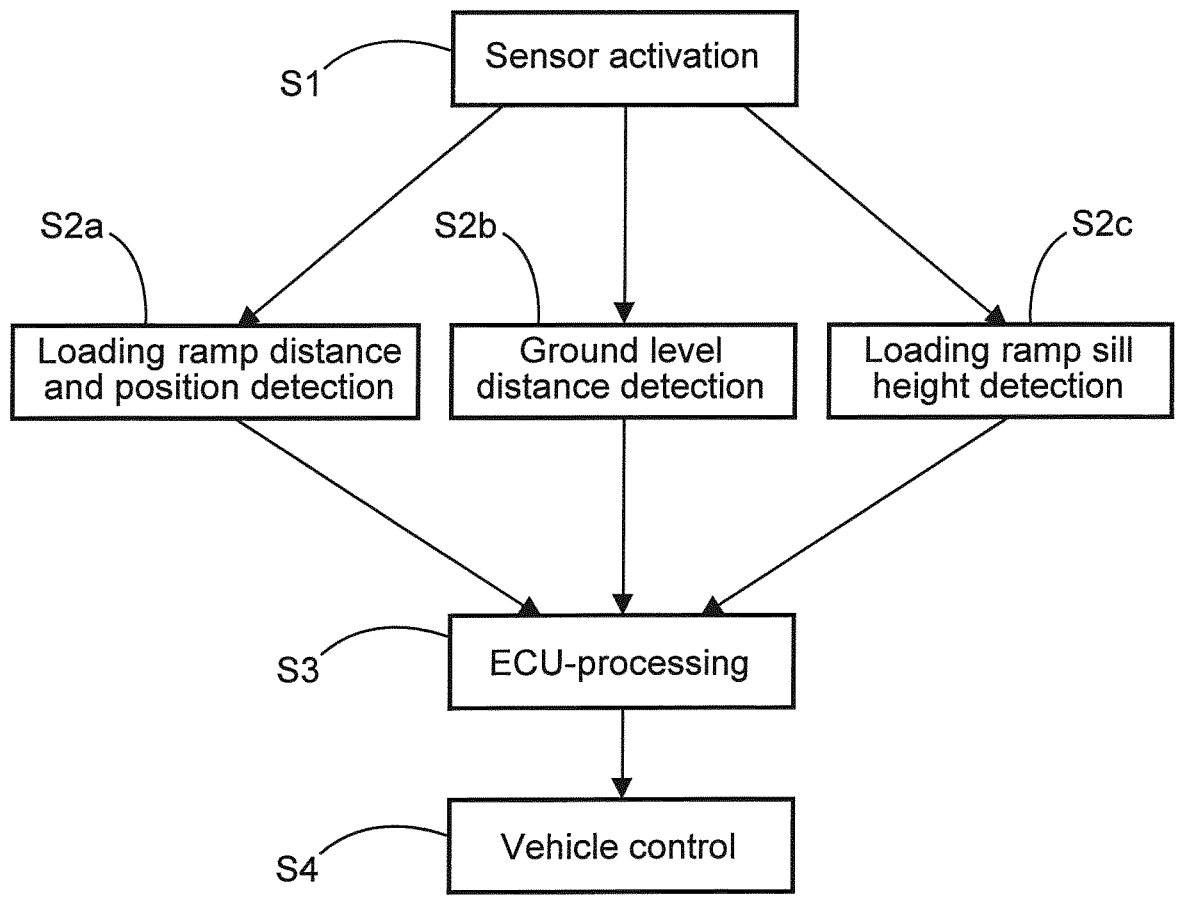
FIG. 3 is a flow chart of a method according to the invention.

Alternatively, the ramp docking sensor 16' may be provided additionally to the ramp docking sensor 16. Then, the ramp docking sensor 16' may be arranged vertically displaced to the ramp docking sensor 16, as when arranged as described above. Further, the ramp docking sensor 16' may be arranged laterally displaced to the ramp docking sensor 16. E.g. the ramp docking sensor 16 may be arranged at the right side of the vehicle's rear end, the ramp docking sensor may be arranged at the left side of the vehicle's rear end. By that, the field of view covered by the sensors may be enlarged vertically in the first case and laterally in the second case FIG. 3 is a flow chart of a method according to the invention.

After the vehicle is positioned for docking to a loading ramp, in activation step S1, the sensor is activated.

In detection step S2a, b and c, the sensor detects position and distance of the loading ramp 21, the distance of the ground level 2 and the height of the loading ramp sill 22.

In processing step S3, the ECU 19 evaluates the results received from the ramp docking sensor 16, 16' and determines suitable output signals for either controlling the cargo hold floor level, driving speed, brake activation and steering input or for indicating corresponding actions that then manually have to be performed by the vehicle operator.

In vehicle control step S4, these commands are applied to the vehicle and the vehicle is controlled to adapt the cargo hold floor level or to indicate to the vehicle operator how to adapt a cargo hold floor level.

Figure 4:
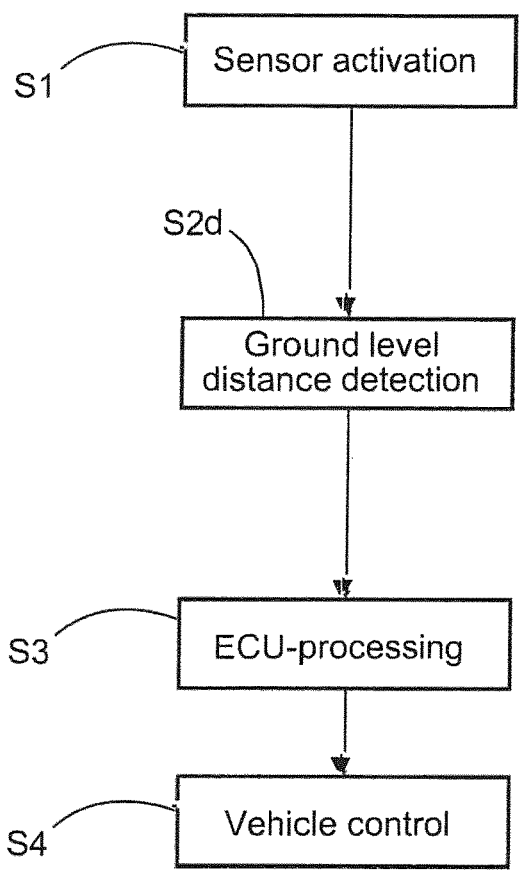
FIG. 4 is a flow chart of a method according to an improvement of the invention.

FIG. 4 is a flow chart of a method according to an improvement of the invention.

As in FIG. 3, in activation step S1, the sensor 16, 16' is activated.

In ground level distance detection step S2d, the sensor 16, 16' detects the distance of the ground level 2.

In processing step S3, the ECU 19 evaluates the results received from the ramp docking sensor 16, 16' and determines suitable output signals for controlling the vehicle height level to adjust a height level of the vehicle 1

In vehicle control step S4, these commands are applied to the vehicle and the vehicle is controlled to adapt the vehicle's height level or to indicate to the vehicle operator how to adapt the vehicle's height level. This may be done as a replacement of a conventional height level sensor system or as a redundancy of a conventional height level system.

Figure 5:
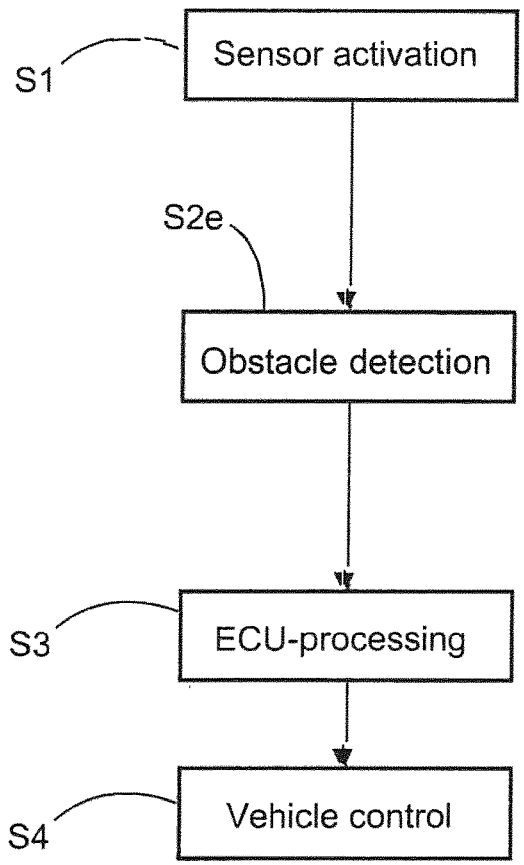
FIG. 5 is a flow chart of a method according to a further improvement of the invention.

FIG. 5 is a flow chart of a method according to a further improvement of the invention.

As in FIG. 3 or 4, in activation step S1, the sensor 16, 16' is activated.

In obstacle detection step S2e, the sensor 16, 16' detects the sensor detects position and distance of possible obstacles in the path of the vehicle.

In processing step S3, the ECU 19 evaluates the results received from the ramp docking sensor 16, 16' and determines whether a detected object represents an obstacle in the path of the vehicle. Further, the ECU 19 determines suitable output signals for controlling driving speed, brake activation or steering input or for indicating corresponding actions that then manually have to be performed by the vehicle operator.

In vehicle control step S4, these commands are applied to the vehicle and the vehicle is controlled to avoid the detected obstacle or to indicate to the vehicle operator how to avoid the detected obstacle.

Height level control and obstacle avoidance may be applied together, per se or not at all with the loading ramp height adjustment.

In the above embodiment, the ramp docking sensor 16 is the only sensor determining a distance relative to the ground level 2. Alternatively, however, e.g. in highly automated driving vehicles, the ramp docking sensors 16, 16' may serve as backup sensors for dedicated height level sensors.

In the above embodiment, the ramp docking sensor 16 is provided as one sensor module. However, the ramp docking sensor may comprise two sensor modules or may be separated in two distinct sensors, wherein one sensor provides ramp docking functionality and the other sensor provides adaption to the ramp sill height. These sensors may be such sensors that provide distance information and direction information, like e.g. radar or LIDAR sensors. The sensors or sensor modules may be of the same technology, e.g. both are radar sensors, or of different technology, e.g. one sensor is a radar sensor and the other sensor is a LIDAR sensor.

Although in the embodiment, the electronic control unit 19 is provided as a device separate from the ramp docking sensor 16, the electronic control unit 19 may be integrated into the ramp docking sensor 16.

Although in the embodiment, the ramp docking sensors 16, 16' are arranged at specific heights, they also may be arranged at any height at the rear end of the vehicle 1, e.g. in a height of 0.2 to 4.5 m, 0.2 to 1.5 m or 3.5 to 4.5 m above ground level.

Although in the embodiments, the ramp docking sensors 16, 16' are arranged in the vicinity of a center line of the vehicle 1, they also may be arranged off-center at any location over the complete width of the vehicle 1, e.g. in the center line+/−1.5 m, in the center line+/−1 m or in the center line+/−0.3 m Although in the embodiments, the ramp docking sensors 16, 16' are oriented in a specific orientation, they may be oriented differently, e.g. 0°+/−10° in all axles, 0°+/−20° in all axles or 0°+/−40° in all axles.

In this document, the term "ground level" is meant to describe a plane that corresponds to the surface of the object that supports the vehicle on its wheels for the largest part against the force induced by gravity.

In this document, the terms "vertical distance" is meant to describe a distance of an object in a direction perpendicular to the ground level 2.

In this document, the terms "and", "or" and "either . . . or" are used as conjunctions in a meaning similar to the logical conjunctions "AND", "OR" (often also "and/or") or "XOR", respectively. In particular, in contrast to "either . . . or", the term "or" also includes occurrence of both operands.

Method steps indicated in the description or the claims only serve an enumerative purpose of the required method steps. They only imply a given sequence or an order where their sequence or order is explicitly expressed or is—obvious for the skilled person—mandatory due to their nature. In particular, the listing of method steps do not imply that this listing is exhaustive.

In the claims, the word "comprising" does not exclude other elements or steps, and the indefinite article "a" or "an" does not exclude a plurality and has to be understood as "at least one".

LIST OF REFERENCE SIGNS 1, 1' vehicle
11 vehicle rear end
12 first rear axle
13 second rear axle
14 third rear axle
15 cargo hold floor
16, 16' ramp docking sensor
17 first radar scanning range
18 second radar scanning range
19 ECU
2 ground level
21 loading ramp
22 loading ramp sill

The invention claimed is:

1. A sensor controlled system, comprising:
 a ramp docking sensor mountable to a vehicle's rear end and configured to fulfill the functions required for assisting docking of a vehicle to a loading ramp,
 wherein the ramp docking sensor is further configured to:
  determine a vertical distance of the ramp docking sensor relative to a ground level, and
  determine a vertical distance between the ground level and a loading ramp sill of the loading ramp.

2. The sensor controlled system of claim 1, further comprising:
 an electronic control unit connected to the ramp docking sensor, the electronic control unit being configured to:
  receive sensor signal information from the ramp docking sensor,
  process the sensor signal information received from the ramp docking sensor,
  determine a vertical distance of the loading ramp sill relative to the ground level, and
  determine a vertical distance of a cargo hold floor of the vehicle.

3. The sensor controlled system of claim 2, wherein the electronic control unit is further configured to:
 output control commands to a height adjustment system of the vehicle that effect a reduction in a difference of the vertical distance between the ground level relative to the cargo hold floor and the vertical distance between the ground level relative to the loading ramp sill.

4. The sensor controlled system of claim 2, wherein the electronic control unit is further configured to:
 output indication signals, indicating to a vehicle operator information that allows the vehicle operator to manually reduce a difference of the vertical distance between the ground level relative to the cargo hold floor and the vertical distance between the ground level relative to the loading ramp sill.

5. The sensor controlled system of claim 1, wherein the ramp docking sensor comprises a first and a second sensor module.

6. The sensor controlled system of claim 5, wherein
 the first sensor module is configured to provide functions required for assisting docking of the vehicle to the loading ramp and the second sensor module is configured to determine the vertical distance of the ramp docking sensor relative to a ground level and the vertical distance between the ground level and a loading ramp sill of the loading ramp, or
 the first sensor module comprises a field of view that is different from the second sensor module.

7. The sensor controlled system of claim 1, wherein
 the ramp docking sensor is further configured to determine a distance to an obstacle obstructing a path of the vehicle towards the loading ramp.

8. The sensor controlled system of claim 7, wherein the electronic control unit is further configured to:
 determine an occurrence of an imminent collision with the obstacle, and
 output control commands to a brake system of the vehicle activating a brake to decelerate the vehicle and prevent the collision, or
 output indication signals that indicate to a vehicle operator or an observer that a collision is imminent.

9. A vehicle, comprising:
 a ramp docking sensor mountable to a vehicle's rear end and configured to fulfill the functions required for assisting docking of a vehicle to a loading ramp,
 wherein the ramp docking sensor is further configured to:
  determine a vertical distance of the ramp docking sensor relative to a ground level, and
  determine a vertical distance between the ground level and a loading ramp sill of the loading ramp;
 an electronic control unit connected to the ramp docking sensor, the electronic control unit being configured to:
  receive sensor signal information from the ramp docking sensor,
  process the sensor signal information received from the ramp docking sensor,
  determine a vertical distance of the loading ramp sill relative to the ground level, and
  determine a vertical distance of a cargo hold floor of the vehicle; and
 means for altering the vertical distance of a cargo hold floor relative to the ground level.

10. The vehicle according to claim 9, further comprising:
 a brake system having a brake configured to maintain a speed of the vehicle or to decelerate or stop the vehicle, the brake system being operated by the electronic control unit.

11. The vehicle according to claim 9, wherein the ramp docking sensor is arranged in the vehicle at or adjacent to a rear end:
 (i) in a centre line+/−1.5 m, in the centre line+/−1 m, or in the centre line+/−0.3 m, and/or
 (ii) at a height of 0.2 to 4.5 m, 0.2 to 1.5 m, or 3.5 to 4.5 m above ground level, and/or (iii) in an orientation rearward 0°+/−10° in all axles, 0°+/−20° in all axles, or 0°+/−40° in all axles.

12. A method for adjusting a level of a cargo hold floor, the method comprising the steps of:

activating a ramp docking sensor;

determining, by the ramp docking sensor, a vertical distance of the ramp docking sensor relative to a ground level; and determining, by the same ramp docking sensor, a vertical distance between the ground level and a loading ramp sill of a loading ramp.

13. The method of claim 12, further comprising the steps of:

receiving, by an electronic control unit, the sensor signal information from the ramp docking sensor;

processing, by the electronic control unit, the sensor signal information received from the ramp docking sensor;

determining, by the electronic control unit, a vertical distance of the loading ramp sill relative to the ground level; and determining, by the electronic control unit, a vertical distance of a cargo hold floor of the vehicle.

14. The method of claim 13, further comprising the step of:

outputting, by the electronic control unit, control commands to a height adjuster of the vehicle that effect a reduction in a difference of the vertical distance between the ground level relative to the cargo hold floor and the vertical distance between the ground level relative to the loading ramp sill.

15. The method of claim 13, further comprising the step of:

outputting, by the electronic control unit, indication signals, indicating to a vehicle operator information that allows the vehicle operator to manually reduce a difference of the vertical distance between the ground level relative to the cargo hold floor and the vertical distance between the ground level relative to the loading ramp sill.

16. The method of claim 13, further comprising the step of:

determining, by the ramp docking sensor, a distance to an obstacle obstructing a path of the vehicle towards the loading ramp.

17. The method of claim 16, further comprising the steps of:

determining, by the electronic control unit, an occurrence of an imminent collision with the obstacle; and outputting, by the electronic control unit, control commands to a brake system of the vehicle activating a brake and preventing the collision; and/or outputting, by the electronic control unit, indication signals that indicate to a vehicle operator or an observer that a collision is imminent.

* * * * *